United States Patent
Furutani

(10) Patent No.: US 9,507,338 B2
(45) Date of Patent: Nov. 29, 2016

(54) MOTOR CONTROL DEVICE AND CORRECTION DATA GENERATION METHOD IN SAME

(71) Applicant: YAMAHA HATSUDOKI KABUSHIKI KAISHA, Shizuoka-ken (JP)

(72) Inventor: Atsuo Furutani, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 79 days.

(21) Appl. No.: 14/602,488

(22) Filed: Jan. 22, 2015

(65) Prior Publication Data

US 2015/0212511 A1 Jul. 30, 2015

(30) Foreign Application Priority Data

Jan. 27, 2014 (JP) ................. 2014-012319
Jan. 27, 2014 (JP) ................. 2014-012320

(51) Int. Cl.
| | | |
|---|---|---|
| G05D 23/275 | (2006.01) | |
| G05B 19/404 | (2006.01) | |
| H02P 6/00 | (2016.01) | |
| H02P 6/16 | (2016.01) | |
| H02P 7/00 | (2016.01) | |

(52) U.S. Cl.
CPC ............ G05B 19/404 (2013.01); H02P 6/007 (2013.01); H02P 6/16 (2013.01); H02P 7/0094 (2013.01)

(58) Field of Classification Search
USPC ....... 318/632, 652, 127, 721, 823, 265, 282, 318/286, 489
See application file for complete search history.

(56) References Cited

U.S. PATENT DOCUMENTS

| | | | |
|---|---|---|---|
| 7,800,321 B2 | 9/2010 | Knittel et al. | |
| 8,754,600 B2* | 6/2014 | Holzmann | ........... G01D 5/2451 318/400.01 |
| 2008/0034985 A1* | 2/2008 | Suzuki | ...................... B30B 1/14 100/35 |
| 2008/0298784 A1 | 12/2008 | Kastner | |

(Continued)

FOREIGN PATENT DOCUMENTS

| | | |
|---|---|---|
| DE | 102010006581 A1 | 9/2011 |
| EP | 0997341 A1 | 5/2000 |

(Continued)

OTHER PUBLICATIONS

The extended European search report issued by the European Patent Office on Jun. 3, 2015, which corresponds to European Patent Application No. 15000220.2-1806 and is related to U.S. Appl. No. 14/602,488.

Primary Examiner — Jorge L Carrasquillo
(74) Attorney, Agent, or Firm — Studebaker & Brackett PC

(57) ABSTRACT

In-forward-rotation command information is obtained by sampling command signals during one or more rotations of a rotary shaft in a constant speed region while a motor is driven in a forward drive pattern including the constant speed region where the rotary shaft rotates in a forward direction at a constant speed. In-reverse-rotation command information is obtained by sampling the command signals during one or more rotations of the rotary shaft in a constant speed region while the motor is driven in a return drive pattern including the constant speed region where the rotary shaft rotates in a reverse direction at the constant speed. Correction data is generated using the in-forward-rotation command information and the in-reverse-rotation command information.

26 Claims, 16 Drawing Sheets

(56) References Cited

U.S. PATENT DOCUMENTS

2012/0249025 A1\* 10/2012 Okita .................. H02P 21/34
 318/400.02
2013/0215728 A1\* 8/2013 Kunida ................ G01R 31/34
 369/53.43
2014/0001815 A1 1/2014 Tanaka et al.

FOREIGN PATENT DOCUMENTS

| EP | 2688197 A1 | 1/2014 |
| JP | S60-73316 A | 4/1985 |
| JP | 2541169 B2 | 10/1996 |
| JP | 5281102 B2 | 9/2013 |

\* cited by examiner

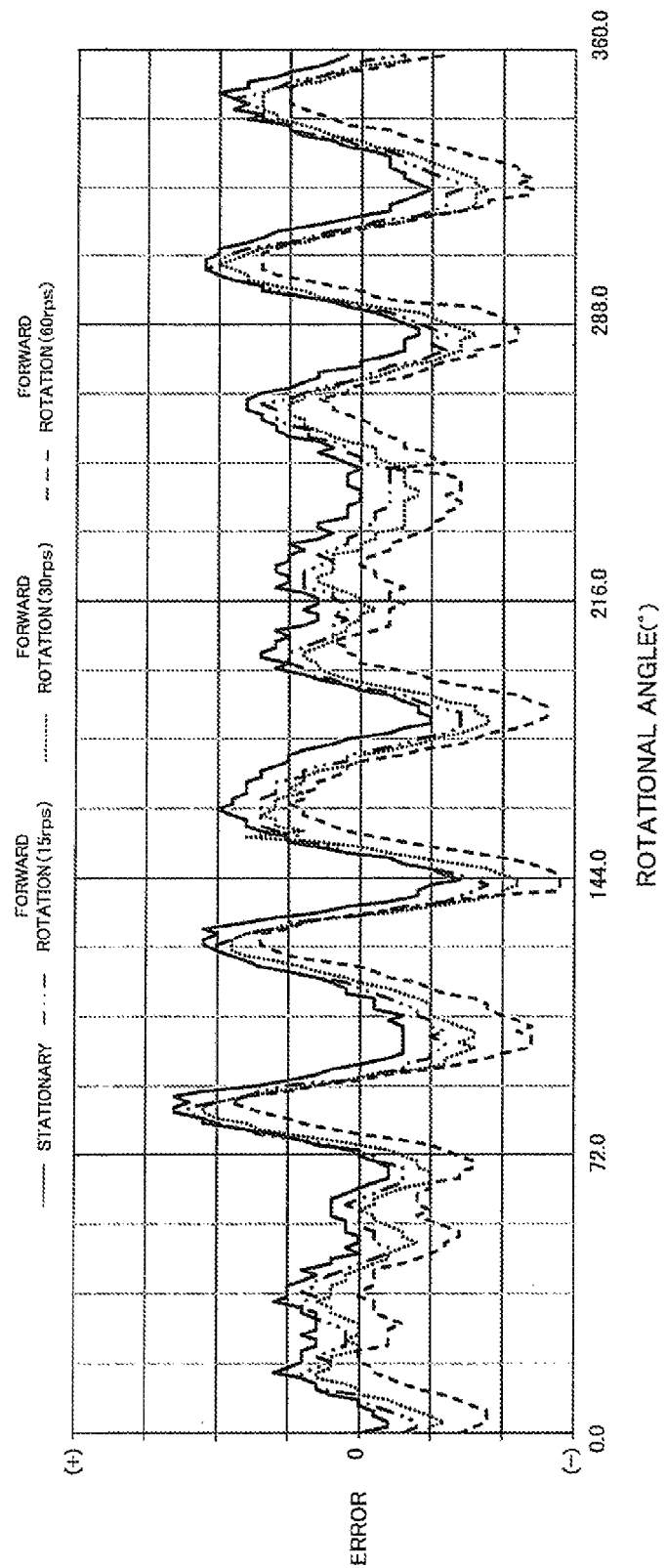

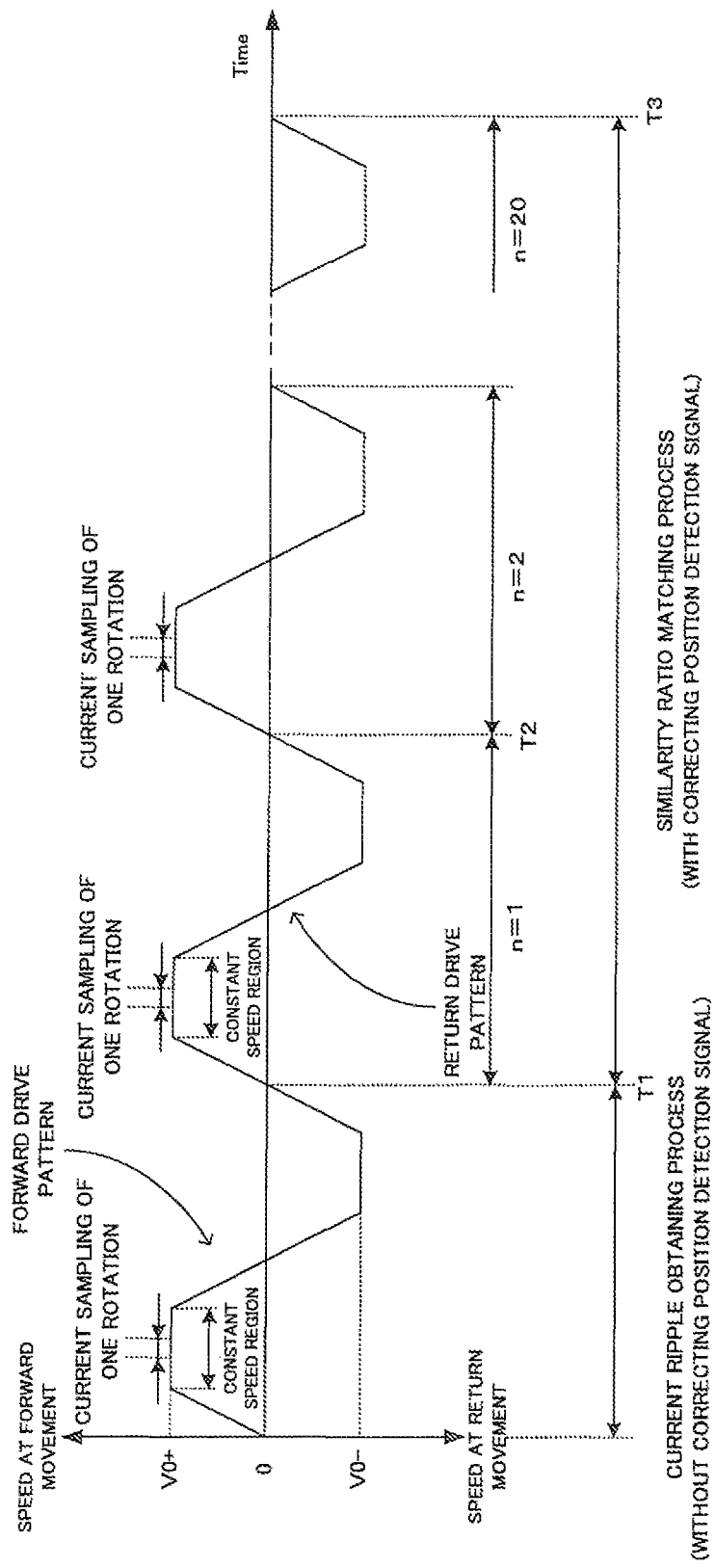

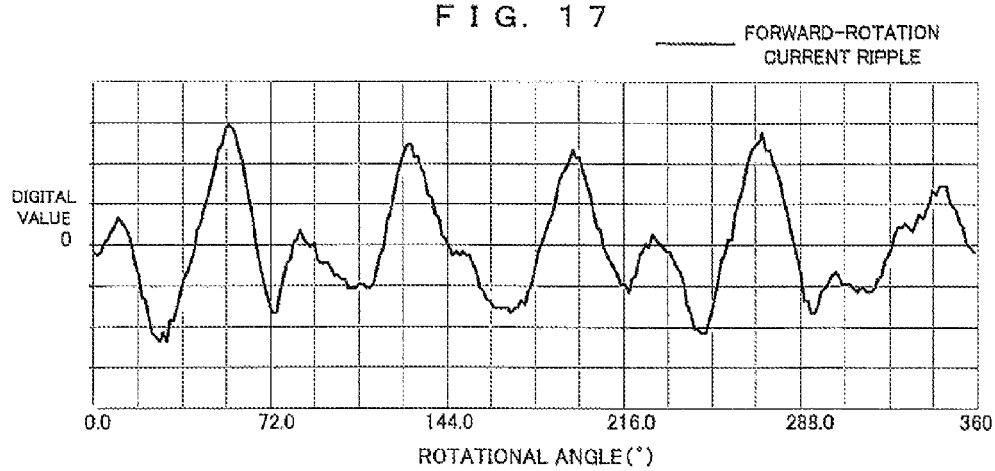
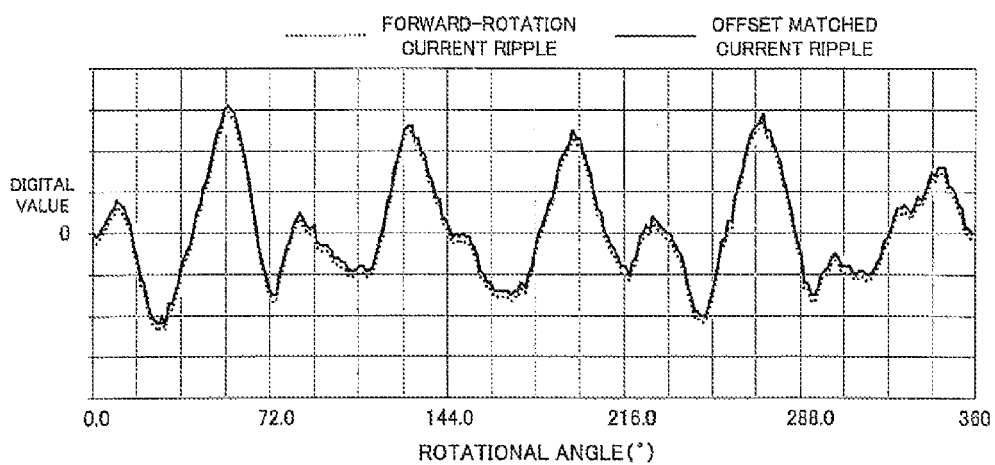

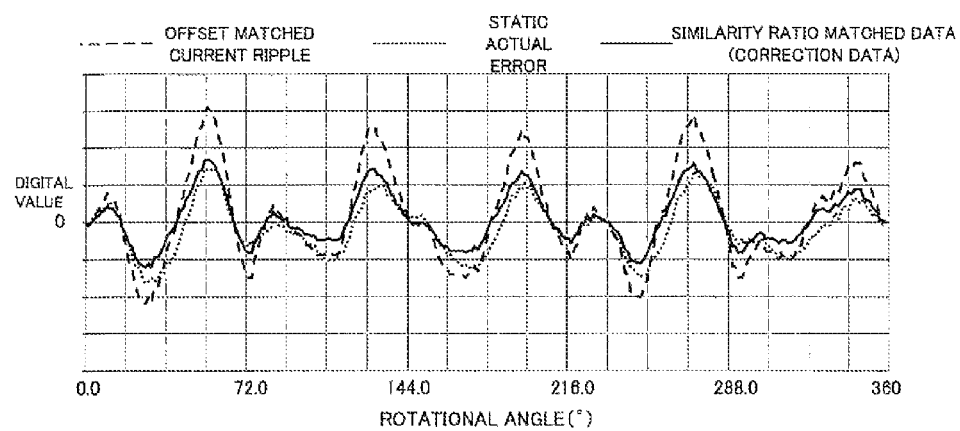
F I G. 19

MOTOR CONTROL DEVICE AND CORRECTION DATA GENERATION METHOD IN SAME

CROSS REFERENCE TO RELATED APPLICATIONS

This application claims benefit of priority to Japanese Patent Application Nos. 2014-012319 filed Jan. 27, 2014, and 2014-012320 filed Jan. 27, 2014, the entire content of each of which is incorporated herein by reference.

TECHNICAL FIELD

The technical field relates to a motor control device for controlling a motor by feeding back a corrected position signal. In the motor control device, a position detection signal of a rotary shaft of a motor is generated based on a signal output from a sensor such as a resolver or an encoder connected to the rotary shaft. The corrected position signal is obtained by correcting the position detection signal by correction data. The technical field also relates to a correction data generation method for generating the correction data used in the same device.

BACKGROUND

In a motor control technology, it is necessary to detect a rotational position of a rotary shaft of a motor in order to obtain a positional deviation between a position command and an actual rotational position of the rotary shaft. One position detector is a resolver. Here, in the case of using the resolver, a position correction technology in consideration of a position detector error of the resolver is necessary. Accordingly, in devices disclosed in Japanese Patents No. 2541169 and 5281102, correction data is stored in a memory in advance, a corrected position signal is generated by correcting a position detection signal generated based on a signal output from the resolver by the correction data and the motor is feedback-controlled using this corrected position signal during a motor control.

SUMMARY

Although the correction data is generated from the position detection signal detected by the resolver in Japanese Patents No. 2541169 and 5281102, this correction data is not necessarily highly accurate. Hence, it has been difficult to control the motor with high accuracy even if the position detection signal is corrected using the correction data.

This disclosure was developed in view of the above problem and aims to enable the generation of correction data, used in a motor control device for controlling a motor based on a signal output from a sensor such as a resolver or an encoder, with a high degree of accuracy and improve the accuracy of a motor control.

According to a first aspect of the disclosure, there is provided a correction data generation method for generating correction data in a motor control device that generates a position detection signal relating to a rotational position of a rotary shaft of a motor based on a signal output from a sensor in accordance with a rotational angle of the rotary shaft of the motor which rotates in response to a command signal and that controls the motor by feeding back a corrected position signal obtained by correcting the position detection signal with the correction data. The method comprises: obtaining in-forward-rotation command information by sampling the command signals during one or more rotations of the rotary shaft in a forward direction in a constant speed region while the motor is driven in a forward drive pattern including the constant speed region where the rotary shaft rotates in the forward direction at a constant speed; obtaining in-reverse-rotation command information by sampling the command signals during one or more rotations of the rotary shaft in a reverse direction in a constant speed region while the motor is driven in a return drive pattern including the constant speed region where the rotary shaft rotates in the reverse direction at the constant speed; and generating the correction data using the in-forward-rotation command information and the in-reverse-rotation command information.

According to a second aspect of the disclosure, there is provided a motor control device for generating a position detection signal relating to a rotational position of a rotary shaft of a motor, which rotates in response to a command signal, based on a signal output from a sensor in accordance with a rotational angle of the rotary shaft and controlling the motor by feeding back a corrected position signal obtained by correcting the position detection signal with the correction data. The device comprises: a motor driver for driving the motor; and a correction data generator for generating the correction data, wherein, in generating the correction data: the motor driver performs forward drive for driving the motor in a forward drive pattern including a constant speed region where the rotary shaft rotates in a forward direction at a constant speed and return drive for driving the motor in a return drive pattern including a constant speed region where the rotary shaft rotates in a reverse direction at the constant speed; and the correction data generator obtains in-forward-rotation command information by sampling the command signals during one or more rotations of the rotary shaft in the forward direction in the constant speed region during the forward drive, obtains in-reverse-rotation command information by sampling the command signals during one or more rotations of the rotary shaft in the reverse direction in the constant speed region during the return drive and generates the correction data using the in-forward-rotation command information and the in-reverse-rotation command information.

According to a third aspect of the disclosure, there is provided a correction data generation method for generating correction data in a motor control device that generates a position detection signal relating to a rotational position of a rotary shaft of a motor based on a signal output from a sensor in accordance with a rotational angle of the rotary shaft of the motor which rotates in response to a command signal and that controls the motor by feeding back a corrected position signal obtained by correcting the position detection signal with the correction data. The method comprises: a first step of obtaining in-rotation command information from sampling data obtained by sampling the command signals during one or more rotations of the rotary shaft in a constant speed region while the motor is driven in a drive pattern including the constant speed region where the rotary shaft rotates at a constant speed; and a second step of generating the correction data by multiplying the in-rotation command information by a similarity ratio.

According to a fourth aspect of the disclosure, there is provided a motor control device for generating a position detection signal relating to a rotational position of a rotary shaft of a motor, which rotates in response to a command signal, based on a signal output from a sensor in accordance with a rotational angle of the rotary shaft and controlling the motor by feeding back a corrected position signal obtained by correcting the position detection signal by the correction data. The device comprises: a motor driver for driving the motor; and a correction data generator for generating the correction data, wherein, in generating the correction data: the motor driver drives the motor in a drive pattern including a constant speed region where the rotary shaft rotates at a constant speed; and the correction data generator obtains in-rotation command information based on sampling data obtained by sampling the command signals during one or more rotations of the rotary shaft in the constant speed region and generates the correction data by multiplying the in-rotation command information by a similarity ratio.

The above and further objects and novel features of the disclosure will more fully appear from the following detailed description when the same is read in connection with the accompanying drawings. It is to be expressly understood, however, that the drawings are for the purpose of illustration only and are not intended as a definition of the limits of the disclosure.

BRIEF DESCRIPTION OF THE DRAWINGS

FIG. 2 is a graph showing a relationship between a static actual error recognized in the device shown in FIG. 1A and actual dynamic errors during forward rotation.

FIG. 16 is a view showing a speed pattern of the motor during a correction data generating process according to the second embodiment.

FIG. 17 is a graph showing an example of a forward-rotation current ripple according to the second embodiment.

FIG. 18 is a graph showing an offset matching operation according to the second embodiment.

FIG. 19 is a graph showing an example of a similarity ratio matching operation according to the second embodiment.

DETAILED DESCRIPTION

Figure 1A:
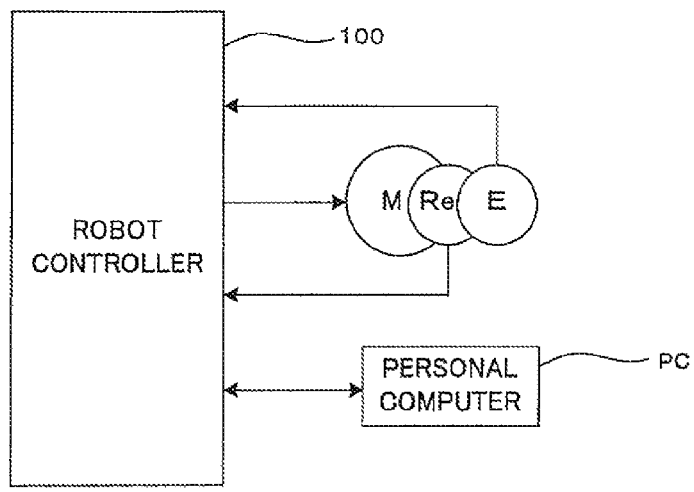
FIG. 1A is a view showing a motor control device used for obtaining knowledge that forms foundations for the disclosure.

A. Similarity Relationship Between Position Detection Error of Resolver and Current Command The inventor of this application conducted various experiments using a motor control device having a configuration shown in FIG. 1A and obtained knowledge that there was a similarity relationship between a position detection error of a resolver and a current command. Here, a motor control device 100 used in the experiments is a robot controller and a motor M is driven to rotate by this motor control device 100. As shown in FIG. 1A, not only a resolver Re, but also a reference position detector E capable of detecting a position with higher accuracy than the resolver Re are mounted on a rotary shaft of this motor M, and detection signals by the resolver Re and the reference position detector E are respectively output to the motor control device 100. Note that PC in FIG. 1A denotes a personal computer connected to the motor control device 100 via a serial communication interface (RS232C).

Figure 1B:
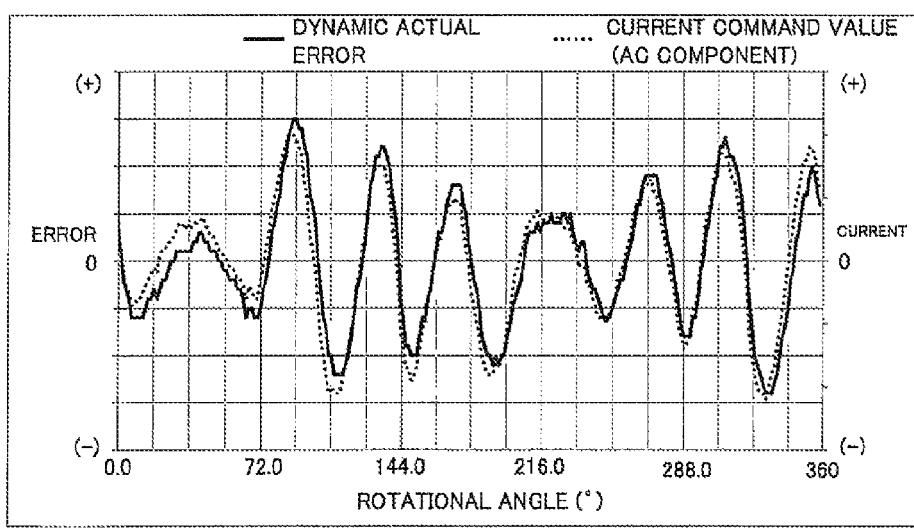
FIG. 1B is a graph showing a relationship of a dynamic actual error and a current command when the resolver is used.

FIG. 1B is a graph showing a relationship of a dynamic actual error and a current command when the resolver is used. This experimental result is obtained by sampling while the motor M is rotated at a constant speed of 30 [rps (="revolution per second" or "rotation per second")]. The dynamic actual error in FIG. 1B means a difference between detection positions of the resolver and the reference position detector measured in a constant-speed operating state. In this embodiment, a value obtained by subtracting the detection position of the reference position detector E from that of the resolver Re at each rotational angle is used and the position detection error of the resolver Re is indicated by this actual dynamic error. Further, the current command indicates an AC component of a current command value in the constant-speed operating state, i.e. a current ripple. In this embodiment, the current ripple is calculated by calculating a section average (direct-current component) of current command signals sampled during one rotation section and subtracting the section average from the current command signal in this section. Note that a horizontal axis of FIG. 1B, i.e. rotational angle is a value obtained by converting the detection position of the reference position detector E into an angle.

As is clear from FIG. 1B, the dynamic actual error that is the position detection error of the resolver Re has a similarity relationship with the AC component (current ripple) of the current command value. Thus, the inventor obtained knowledge that the dynamic actual error could be estimated from the current ripple and position accuracy could be improved by generating correction data from that estimated error and correcting the position detection signal of the resolver Re by this correction data. Further, the inventor measured actual dynamic errors while rotating the motor M in a forward direction at various constant speeds (15 rps, 30 rps, 60 rps) and compiled the measurement result together with a static actual error into FIG. 2. They also measured actual dynamic errors when the motor M was rotated in a reverse direction and compiled the measurement result together with a static actual error into FIG. 3. Note that this "static actual error" means a difference between a detection angle of the resolver Re and that of the reference position detector E measured in a stationary state.

Figure 3:
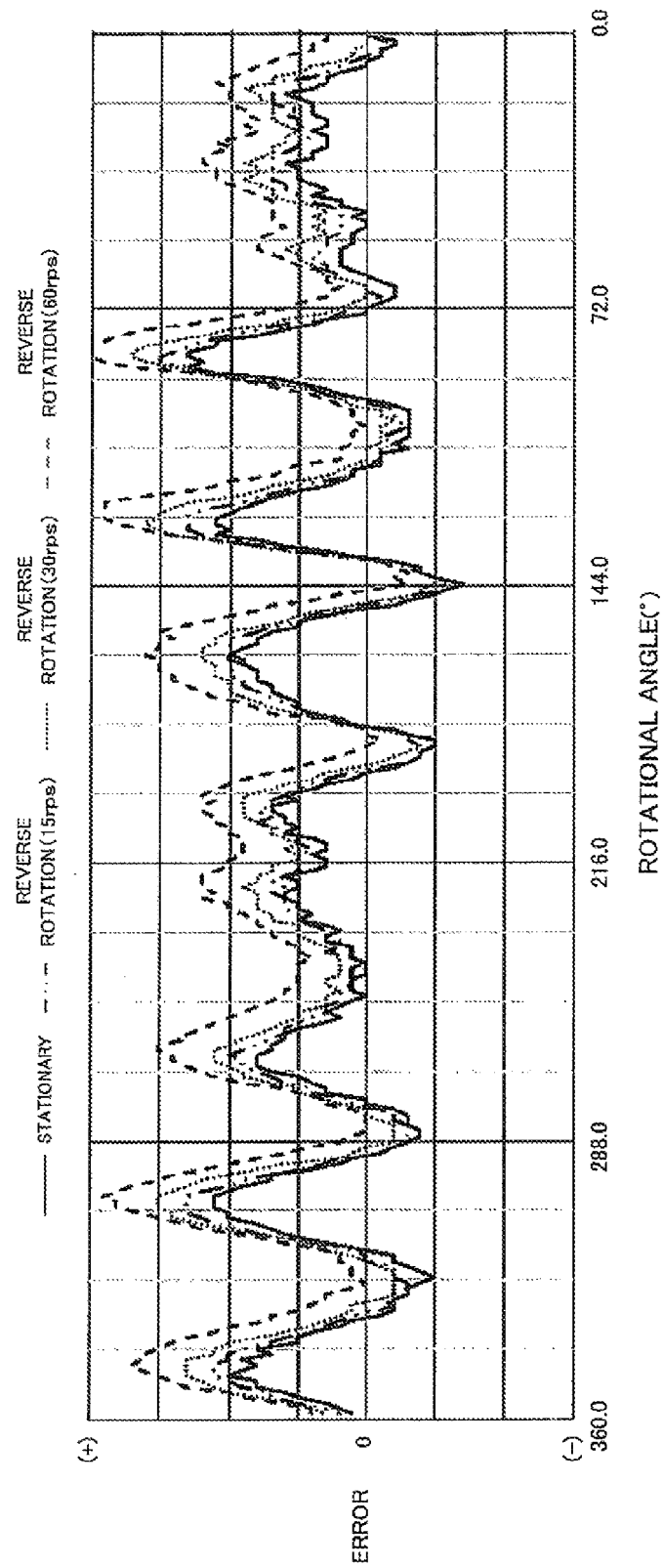
FIG. 3 is a graph showing a relationship between a static actual error recognized in the device shown in FIG. 1A and actual dynamic errors during reverse rotation.
Figure 4:
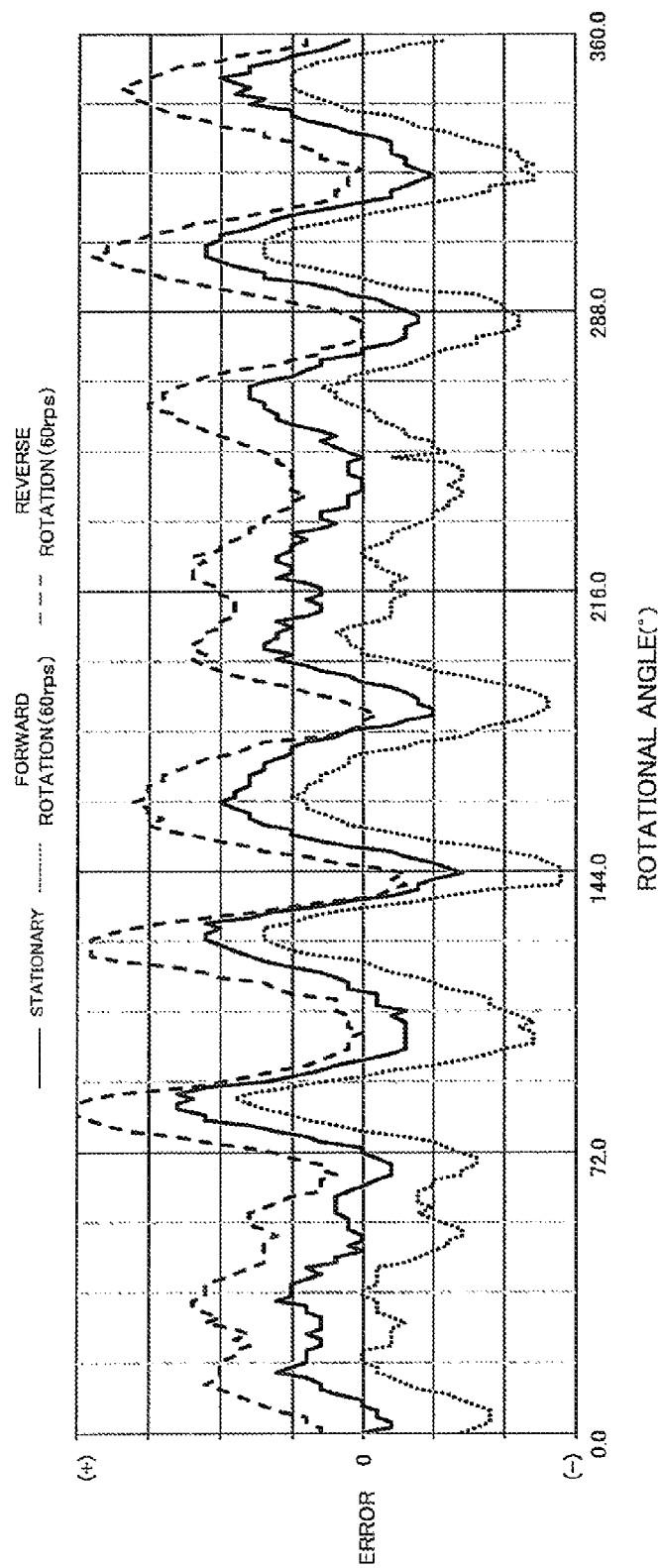
FIG. 4 is a graph showing a relationship of a dynamic actual error during forward rotation, a dynamic actual error during reverse rotation and a static actual error when the motor is reciprocally driven at the same constant speed in the device shown in FIG. 1A.

FIG. 2 is a graph showing a relationship between a static actual error recognized in the device shown in FIG. 1A and actual dynamic errors during forward rotation. Further, FIG. 3 is a graph showing a relationship between a static actual error recognized in the device shown in FIG. 1A and actual dynamic errors during reverse rotation. Furthermore, FIG. 4 is a graph showing a relationship of a dynamic actual error during forward rotation, a dynamic actual error during reverse rotation and a static actual error when the motor is reciprocally driven at the same constant speed in the device shown in FIG. 1A. Note that, in these figures, "stationary" indicates a static actual error which is a difference between a detection angle of the resolver Re and that of the reference position detector E measured in a stationary state.

During forward rotation, as shown in FIG. 2, a phase is delayed and an error increases on a (−) side as the speed increases. Contrary to this, during reverse rotation, a phase is delayed and an error increases on a (+) side as the speed increases since the rotational angle on a horizontal axis is scanned in a direction from 360° to 0° as shown in FIG. 3. One of the main reasons for this is thought to be due to an RD converter built in the motor control device 100. This "RD converter" is a resolver digital converter and has a function of converting an output signal of a resolver into digital angle data. Thus, the error is thought to increase and the phase is thought to tend to be delayed in the detection result of the resolver Re due to a delay system of the RD converter as compared with the detection result of the reference position detector E free from any delay.

Further, if the dynamic actual error when the motor M is rotated in the forward direction at a constant speed of, e.g. 60 rps, the dynamic actual error when the motor M is rotated in the reverse direction at the same speed and the static actual error are plotted on the same graph, as shown in FIG. 4, error increasing directions and phase changing directions are directly opposite during forward rotation and during reverse rotation, and an average of the dynamic actual error during forward rotation and the dynamic actual error during reverse rotation is approximate to the static actual error. That is, the inventor obtained knowledge that the static actual error could be approximately calculated by obtaining the dynamic actual error during forward rotation and the dynamic actual error during reverse rotation while the motor M was driven to reciprocate at the same constant speed and averaging the values of both at each rotational angle (hereinafter, referred to as "first knowledge"). Note that although only the measurement results of 15 to 60 rps are shown in FIGS. 2 to 4, similar measurement results are obtained also for 60 to 100 rps and the above first knowledge is satisfied.

Based on such first knowledge, the inventor reached a conclusion that, after the dynamic actual error during forward rotation and the dynamic actual error during reverse rotation were obtained while the motor M was driven to reciprocate in a forward drive pattern including a constant speed region where the rotary shaft of the motor M rotated in the forward direction at a constant speed and a return drive pattern including a constant speed region where the rotary shaft rotated in the reverse direction at the same speed, correction data could be generated from these with high accuracy.

Further, the inventor obtained the following knowledge by conducting a further experiment using the motor control device having the configuration shown in FIG. 1A.

Figure 5A:
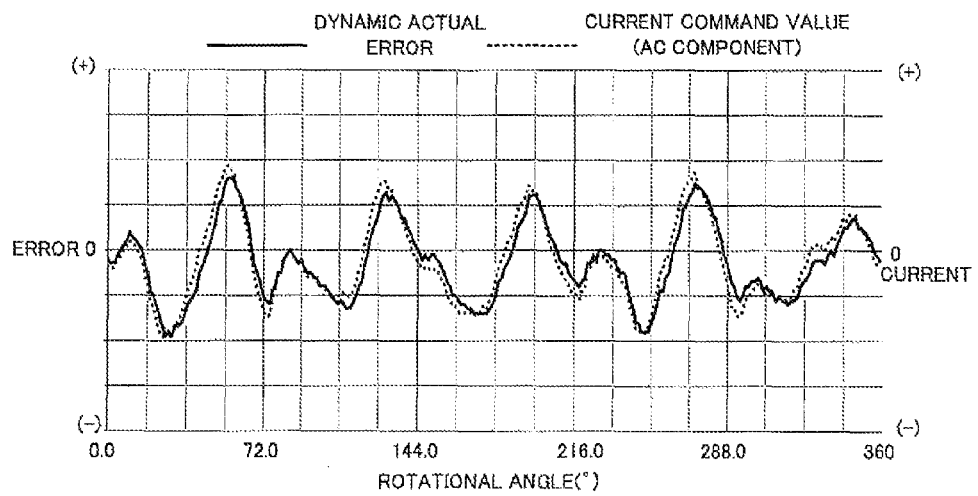
FIG. 5A is a graph showing a relationship of a dynamic actual error and a current command when the resolver is used.

FIG. 5A is a graph showing a relationship of a dynamic actual error and a current command when the resolver is used. This experimental result is obtained by sampling while the motor M is rotated at a constant speed of 30 rps. The dynamic actual error in FIG. 5A means a difference between detection positions of the resolver and the reference position detector measured in a constant-speed operating state. In this embodiment, a value obtained by subtracting the detection position of the reference position detector E from that of the resolver Re at each rotational angle is used as the dynamic actual error that indicates a position detection error of the resolver Re. Further, the current command indicates an AC component of a current command value in the constant-speed operating state, i.e. a current ripple. In this embodiment, current command signals sampled during one rotation section are used as sampling data and the current ripple is calculated by calculating a section average (direct-current component) of the sampling data and subtracting the section average from the current command signal in this section. Note that a horizontal axis of FIG. 5A, i.e. rotational angle is a value obtained by converting the detection position of the reference position detector E into an angle.

As is clear from FIG. 5A, the dynamic actual error that is the position detection error of the resolver Re has a similarity relationship with the AC component (current ripple) of the current command value. Thus, the inventor obtained knowledge that the dynamic actual error could be estimated from the current ripple and position accuracy could be improved by generating correction data from the estimated dynamic actual error and correcting the position detection signal of the resolver Re by this correction data (hereinafter, referred to as "second knowledge"). Although the above knowledge is obtained based on the result of sampling during the rotation of the motor M at the constant speed of 30 rps here, the inventor recognized that the same second knowledge as above was satisfied in a speed range including 30 rps, specifically a speed range of 15 rps to 100 rps.

Figure 5B:
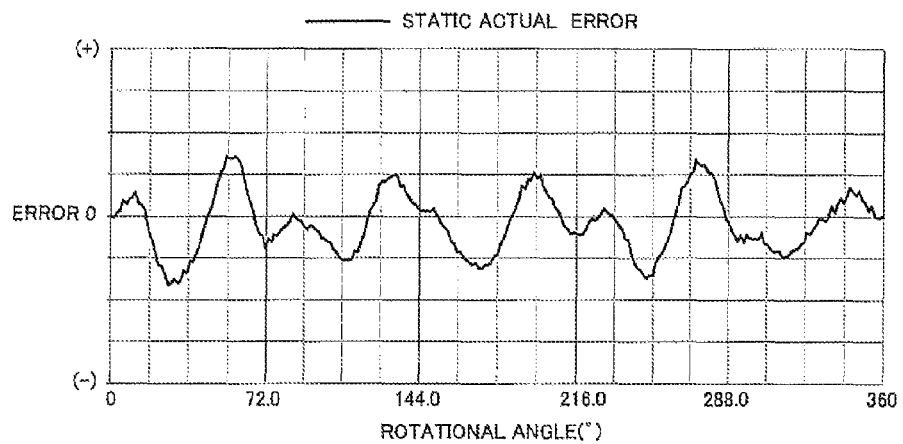
FIG. 5B is a graph showing a static actual error.

FIG. 5B is a graph showing a static actual error. This "static actual error" means a difference between detection angles of the resolver Re and the reference position detector E measured in a stationary state. Here, what should be noted in the static actual error shown in FIG. 5B is that the static actual error is zero when the rotational angle is zero. Thus, the inventor obtained knowledge that the accuracy of the correction data could be further enhanced by further considering a point that the static actual error was zero at a rotational angle of zero (hereinafter, referred to as "third knowledge").

Based on such second and third knowledge, the inventor reached a conclusion that correction data could be generated with high accuracy by calculating a current ripple from sampling data obtained by sampling command signals while the rotary shaft of the motor M rotated at a constant speed and multiplying the current ripple by a suitable similarity ratio.

Embodiments for generating correction data using the above knowledge will be described below with reference to the drawings.

B. First Embodiment

Figure 6:
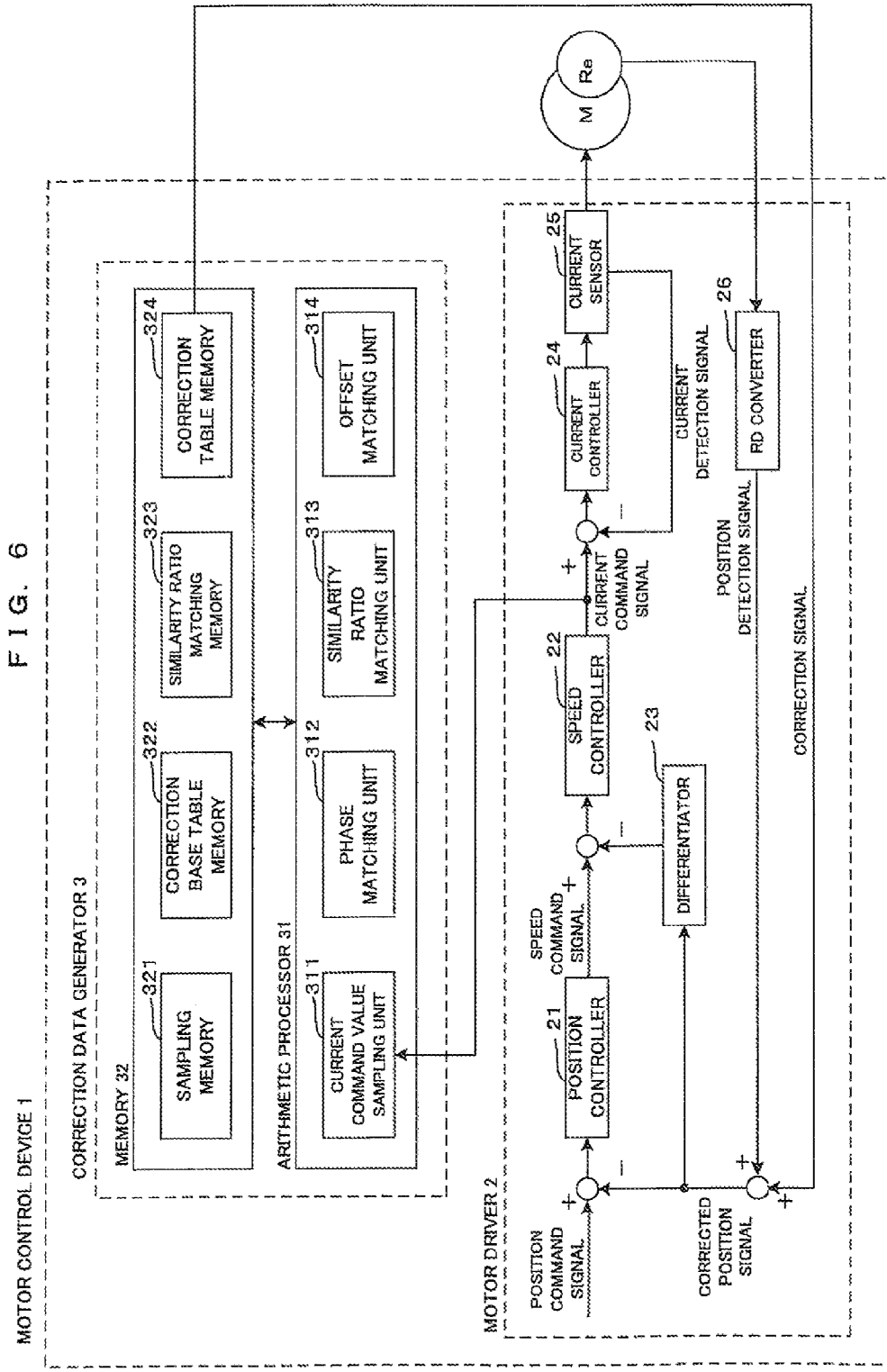
FIG. 6 is a diagram showing the electrical configuration of a first embodiment of a motor control device according to the disclosure.

FIG. 6 is a diagram showing the electrical configuration of a first embodiment of a motor control device according to the disclosure. This motor control device 1 includes a motor driver 2 for driving a motor M based on a position command signal and a correction data generator 3 for generating correction data. The configuration of the correction data generator 3 will be described below after that of the motor driver 2 is described.

In the motor driver 2, a speed command signal is output based on a difference between a position command signal given to a position controller 21 from outside and a corrected position signal to be described later. A speed controller 22 outputs a current command signal based on a difference between a driving speed of the motor M calculated by differentiating the corrected position signal by a differentiator 23 and the speed command signal. This current command signal is output to the correction data generator 3 to be described later and a current controller 24. This current controller 24 outputs a drive command signal to the motor M via a current sensor 25 based on the current command signal. More specifically, the current sensor 25 detects the drive command signal output from the current controller 24 and feeds a current detection signal indicating a current value of the drive command signal back to an input side of the current controller 24. Then, the current controller 24 outputs the drive command signal based on a difference between the current detection signal and the current command signal. The motor M having received the drive command signal then outputs a torque corresponding to this drive command signal.

Further, a resolver Re is connected to a rotary shaft (not shown) of the motor M and detects a rotational position of the rotary shaft to output an analog signal indicating the rotational position. This analog signal is input to an RD converter 26, converted into a digital position detection signal and output. A signal, corrected by adding a correction signal generated in the correction data generator 3 to be described next to this position detection signal, is the above corrected position signal and given to the position controller 21 and the differentiator 23 as described above.

Next, a correction data generation method is described after the configuration of the correction data generator 3 will be described. This correction data generator 3 includes an arithmetic processor 31 having an arithmetic function such as a CPU (Central Processing Unit) or the like and a storage 32 having four memories 321 to 324. The arithmetic processor 31 samples current command signals output from the speed controller 22 in accordance with a program stored in advance while the motor M is reciprocally driven in predetermined drive patterns by the motor driver 2 and generates the correction data by performing a phase matching process, a similarity ratio matching process and an offset matching process to be described in detail next. As just described, in this embodiment, the arithmetic processor 31 functions as a current command value sampling unit 311, a phase matching unit 312, a similarity ratio matching unit 313 and an offset matching unit 314.

Figure 7:
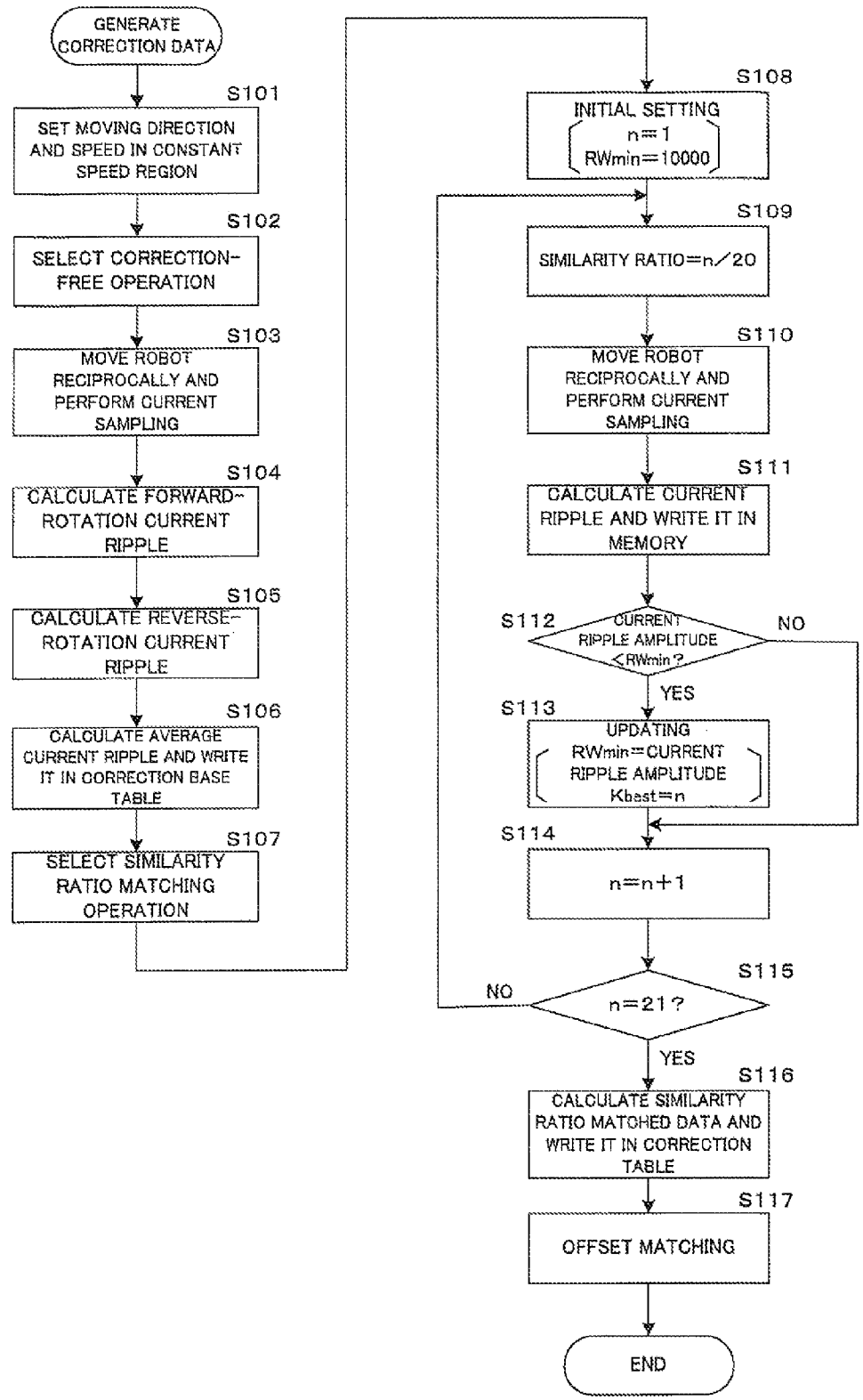
FIG. 7 is a flow chart showing a correction data generating operation in the motor control device shown in FIG. 6.

FIG. 7 is a flow chart showing a correction data generating operation in the motor control device shown in FIG. 6. In this embodiment, a correction data generating process described below is performed in a state where the motor M is incorporated in a device, e.g. in a state where a movable part (movable mechanism part such as a ball screw) of a robot is coupled to the rotary shaft of the motor M in the case of using the motor M as a drive source of the robot, when the motor M or the resolver Re is mounted or exchanged and when the generation of correction data is commanded by a user.

In Step S101, a moving distance and speeds V0+, V0− (where |V0+|=|V0−|) in the constant speed regions of the robot actuated by the motor M under the control of the motor driver 2 are set. By these settings, an operation pattern in which the motor M drives the robot to operate the robot in performing the correction data generating process, i.e. a drive pattern of the motor M by the motor driver 2 is determined. Further, a plurality of operation modes are prepared in advance as operation modes of the motor driver 2. In the correction data generating process, a correction signal is not output to the motor driver 2 at first, i.e. a "correction-free operation" in which the motor M is driven without any correction by the correction data is selected (Step S102) and the phase matching process is performed (Steps S103 to S106).

Figure 8:
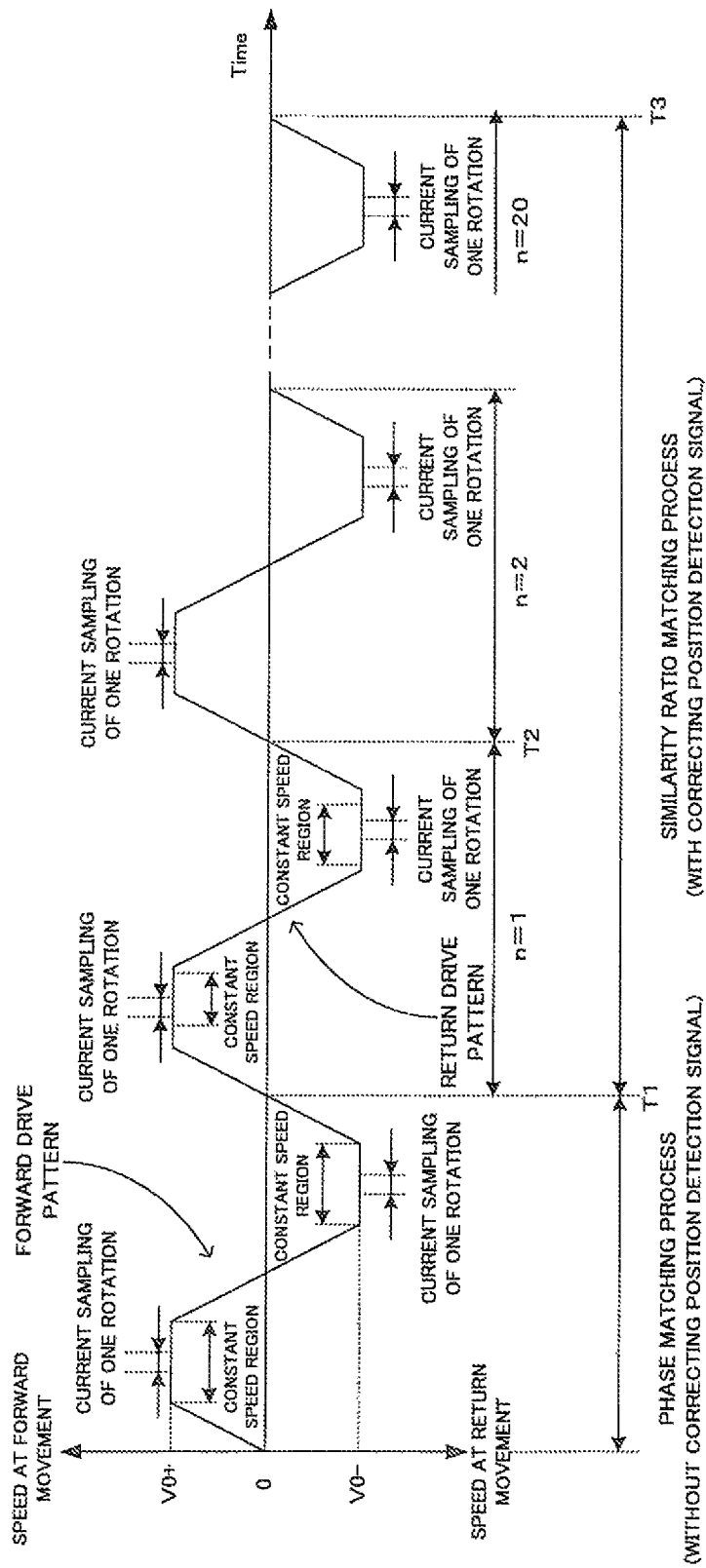
FIG. 8 is a view showing a speed pattern of the motor during a correction data generating process according to the first embodiment.

In the phase matching process, the robot is reciprocally moved by starting the drive of the motor M by the motor driver 2 and current sampling is performed during this movement (Step S103). Specifically, by starting the drive of the motor M, the motor M rotates in the forward direction to accelerate a moving speed of the robot up to the speed V0+ over a predetermined time and, after the constant speed V0+ is maintained for a time corresponding to the moving distance set in Step S101, deceleration is started to stop the forward rotation of the motor M, for example, as shown in FIG. 8. A movement of the robot by the forward rotation of the motor M in this way is called a "forward movement", the drive pattern of the motor M for making such a movement is called a "forward drive pattern" and a region where the constant speed V0+ is maintained in that forward drive pattern is called a "constant speed region". Further, current command signals output from the speed controller 22 of the motor driver 2 during one rotation of the motor M are sampled at fixed time intervals at substantially middle positions of the constant speed region during the forward movement and a current command value at each rotational angle is written as "sampling data of forward rotation" in the current sampling memory 321.

When the forward movement of the robot is completed, the motor M rotates in the reverse direction and moves the robot in a drive pattern which is an inverse of the forward drive pattern. That is, the moving speed of the robot is accelerated up to the speed V0− and, after the constant speed V0− is maintained for a time corresponding to the moving distance set in Step S101, deceleration is started to stop the reverse rotation of the motor M. A movement of the robot by the reverse rotation of the motor M in this way is called a "return movement", the drive pattern of the motor M for making such a movement is called a "return drive pattern" and a region where the constant speed V0− is maintained in that return drive pattern is called a "constant speed region". Further, current command signals output from the speed controller 22 of the motor driver 2 during one rotation of the motor M are sampled at fixed time intervals at substantially middle positions of the constant speed region during the return movement and a current command value at each rotational angle is written as "sampling data of reverse rotation" in the current sampling memory 321.

Figure 9:
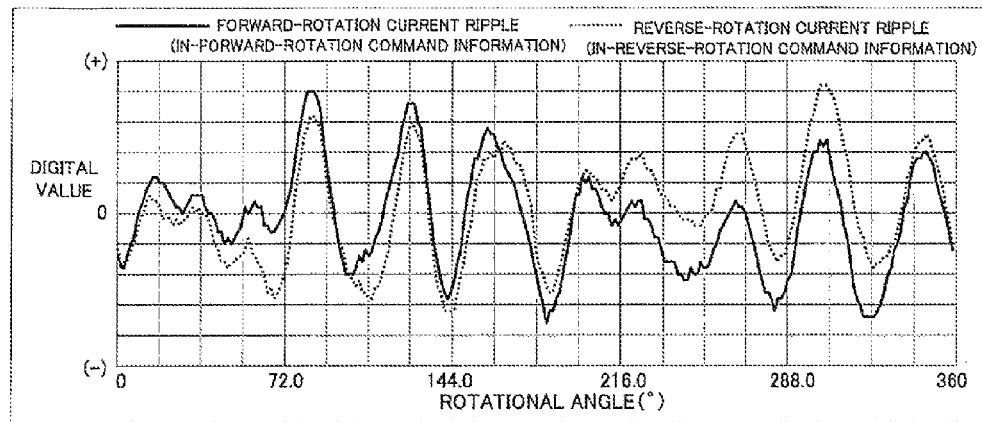
FIG. 9 is a graph showing examples of a forward-rotation current ripple and a reverse-rotation current ripple according to the first embodiment.

In next Step S104, the sampling data of forward rotation is read from the current sampling memory 321 and an average value (direct-current component) of the current command values of one rotation is calculated. Then, a forward-rotation current ripple is calculated by subtracting the above average value from the current command value at each rotational angle and overwritten in the current sampling memory 321. In this way, the forward-rotation current ripple that is an AC component of the current command value during the forward movement is obtained (solid line in FIG. 9).

Also for a reverse rotation side, a reverse-rotation current ripple is calculated similarly to the forward rotation side (Step S105). Specifically, the sampling data of reverse rotation is read from the current sampling memory 321, an average value (direct-current component) of the current command values of one rotation is calculated, a reverse-rotation current ripple is calculated by subtracting the above average value from the current command value at each rotational angle and overwritten in the current sampling memory 321. In this way, the reverse-rotation current ripple that is an AC component of the current command value during the return movement is obtained (dotted line in FIG. 9).

Figure 10:
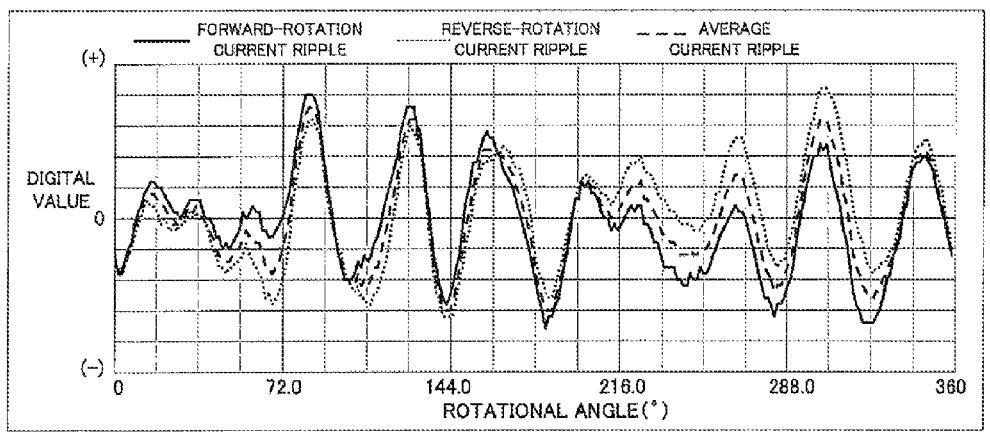
FIG. 10 is a graph showing an example of a phase matching operation according to the first embodiment.

When the forward-rotation current ripple and the reverse-rotation current ripple are calculated, the current ripple of forward rotation and that of reverse rotation are respectively read for each rotational angle from the current sampling memory 321 and an average value of these values is calculated. Then, the average value (=(forward-rotation current ripple+reverse-rotation current ripple)/2) is written as an average current ripple in a correction base table in the memory 322 (Step S106). Note that an example of the average current ripple obtained as described above is shown in broken line in FIG. 10.

When the above phase matching process is completed (timing T1 in FIG. 8), a "similarity ratio matching operation" is selected as the operation mode (Step S107) and the similarity ratio matching process described below is performed (Steps S108 to S116). In this similarity ratio matching process, various initial settings are made in Step S108. In this embodiment, a value obtained by subtracting a minimum value from a maximum value of the average current ripples of one rotation, i.e. a minimum value RWmin of a current ripple amplitude is set as a default value ("10000" in this embodiment) and "1" is set as an initial value of a count value n. A similarity ratio is set at a value (n/20) in next Step S109. For example, the similarity ratio is set at the initial value (1/20) when n=1.

After the similarity ratio (n/20) is set, the average current ripple is read from the correction base table memory 322 and a value obtained by multiplying the average current ripple at each rotational angle by the similarity ratio is output as a correction signal to the motor driver 2. Then, the robot is reciprocally moved and the current sampling is performed during this movement by starting the drive of the motor M by the motor driver 2 while performing a correction by the correction signal (Step S110). Note that the reciprocal movements and the current sampling operation are the same as those during the phase matching process (Step S103) except that the correction by the correction signal is performed, and the sampling data of one forward rotation and that of one reverse rotation are written in the current sampling memory 321. For example, when n=1, the current sampling of one rotation substantially in the center of each constant speed region is performed while the motor M is driven in the successive forward and return drive patterns from timing T1 to timing T2 in FIG. 8.

When the current sampling is completed, the current ripple is calculated and written in the similarity ratio matching memory 323 (Step S111). Specifically, the forward-rotation current ripple is calculated as in Step S104 described above, the reverse-rotation current ripple is calculated as in Step S105 described above and the average current ripple is calculated as in Step S106 described above.

Then, the average current ripple when the similarity ratio is set at (n/20) is written in the similarity ratio matching memory 323.

In next Step S112, after the current ripple amplitude is calculated from the average current ripples of one rotation written in the similarity ratio matching memory 323, it is determined whether or not this current ripple amplitude is below the minimum value RWmin. If "YES" is determined in Step S112, i.e. the current ripple amplitude at the count value n is determined to be below the minimum value RWmin, a transition is made to Step S114 after the minimum value RWmin is updated to the current ripple amplitude and this count value n is written as an optimal value Kbest in the similarity ratio matching memory 323 (Step S113). Note that a storage destination of the optimal value Kbest is not limited to the similarity ratio matching memory 323 and the optimal value Kbest can be written in any arbitrary memory. On the other hand, if "NO" is determined in Step S112, a transition is directly made to Step S114 without updating the minimum value RWmin and the optimal value Kbest.

After the count value n is incremented by "1" in this Step S114, it is determined whether or not the count value n is "21" (Step S115). If "NO" in Step S115, i.e. while the count value n is determined to be not larger than "20", a return is made to Step S119 and a process of deriving the similarity ratio at which the current ripple amplitude is minimized (Steps S109 to S115) is repeated. That is, in this embodiment, (1/20), (2/20), . . . , (20/20) are prepared as candidates for the similarity ratio and the optimal value Kbest is determined after the similarity ratio deriving process is performed for each candidate for the similarity ratio.

On the other hand, if "YES" is determined in Step S115, the optimal value Kbest is read from the similarity ratio matching memory 323 and an optimal similarity ratio (=Kbest/20) at which the current ripple amplitude is smallest is determined. Then, the average current ripple is read from the correction base table memory 322 and a value obtained by multiplying the average current ripple at each rotational angle by the optimal similarity ratio is written as similarity ratio matched data in the correction table memory 324 (Step S116).

Figure 11:
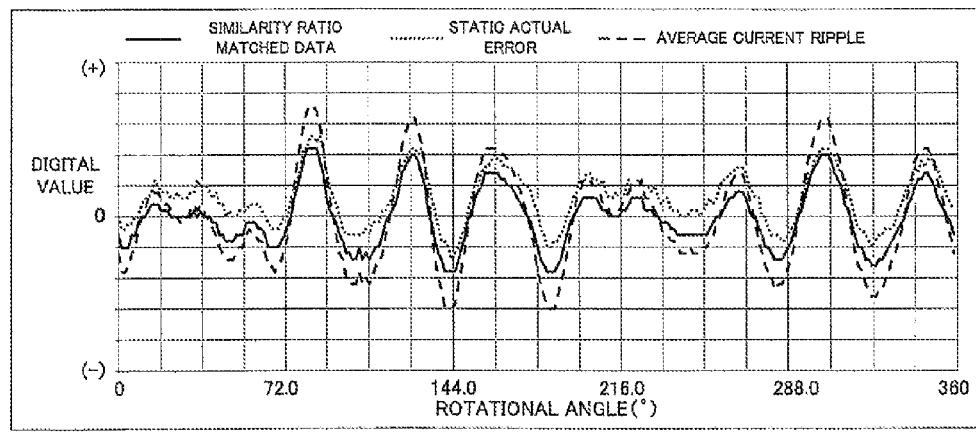
FIG. 11 is a graph showing an example of a similarity ratio matching operation according to the first embodiment.
Figure 12:
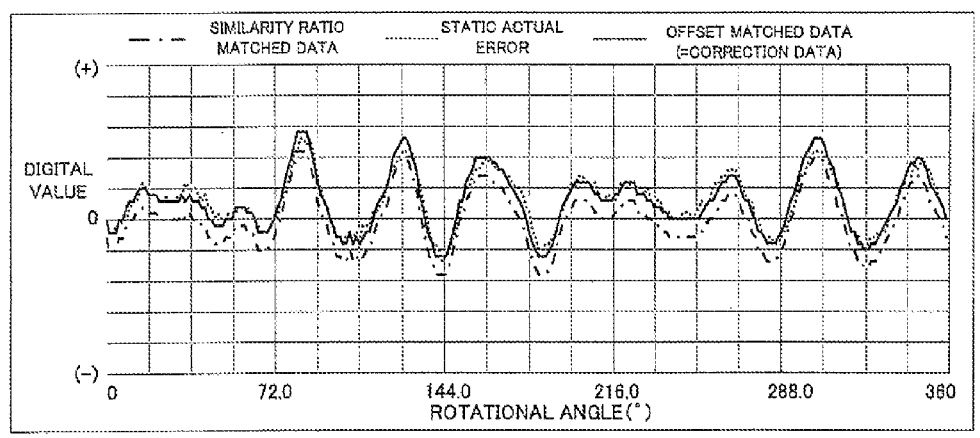
FIG. 12 is a graph showing an example of an offset matching operation according to the first embodiment.
Figure 13:
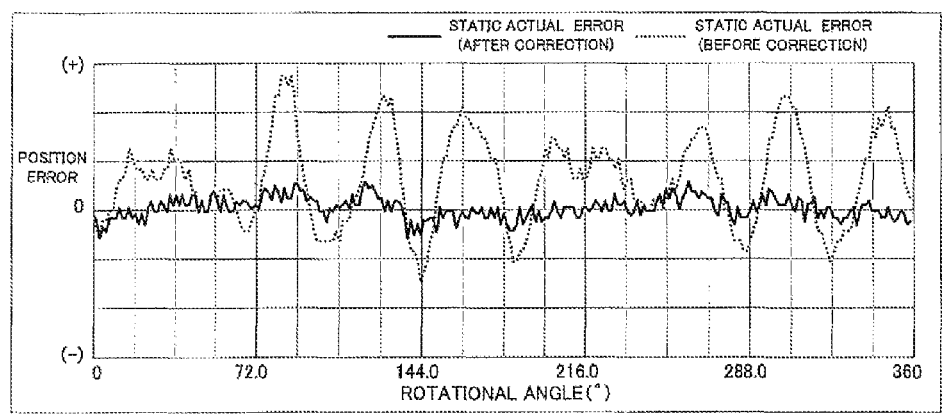
FIG. 13 is a view showing an improvement of a static actual error by using the correction data.

The similarity ratio matched data (solid line in FIG. 11) approximated to the static actual error (dotted line in FIG. 11) is obtained by adjusting the average current ripple using the optimal similarity ratio in this way. The similarity ratio matched data is offset from the static actual error, for example, as shown in FIG. 11 and the static actual error is zero at a rotational angle of 0° as shown in dotted line in FIG. 11. Thus, in this embodiment, offset matching is performed at the end (Step S117). Specifically, the similarity ratio matched data at a rotational angle of zero is subtracted from the similarity ratio matched data at each rotational angle and this offset matched data is overwritten as final correction data (e.g. solid line in FIG. 12) in the correction table memory 324. In this way, more accurate correction data is obtained.

As described above, according to this embodiment, it is possible to generate the correction data with high accuracy and improve the control accuracy of the motor M since the correction data used in the motor control device 1 is generated based on the first to third knowledge described above. Further, in the first embodiment, the average current ripple is calculated from the forward-rotation current ripple and the reverse-rotation current ripple and the similarity ratio matching process is performed on this average current ripple. Thus, "in-rotation command information" of the disclosure can be obtained with high accuracy and the accuracy of the correction data can be further enhanced. The reason for that is that the error increasing directions and the phase changing directions during forward rotation and during reverse rotation are directly opposite to each other and the dynamic actual error can be estimated with higher accuracy from the forward-rotation current ripple and the reverse-rotation current ripple as described in the above section "A. Similarity relationship between position detection error of resolver and current command".

Further, although it has been conventionally proposed as a method for generating correction data to mount a reference position detector and use an error from a position measured by the reference position detector as correction data, a correction facility for generating the correction data is separately necessary in this case. Contrary to this, in the above embodiment, the correction data can be generated by a unique function of the motor control device 1 without using this correction facility at all and own performance can be improved. That is, the motor control device 1 according to the above embodiment has a self-correction function. Further, the correction data can be generated with the motor M mounted in the robot. Thus, even when the motor M is exchanged or repaired in a factory or the like where the robot is installed, correction data can be generated on the spot after the exchange or repair.

Further, in the above embodiment, the correction data is generated utilizing the current command signals after the speed command signal is amplified by the speed controller 22, a sufficiently high resolution can be obtained and position accuracy after the correction can be set higher than the conventional technology. Here, the correction data may be generated using current detection signals instead of the current command signals and functions and effects similar to those of the above embodiment are obtained.

As just described, in this embodiment, the resolver Re corresponds to an example of a "sensor" of the disclosure. Further, the "forward-rotation current ripple" corresponds to an example of "in-forward-rotation command information" of the disclosure and the "reverse-rotation current ripple" corresponds to an example of "in-reverse-rotation command information" of the disclosure. Further, the average current ripple calculated in Step S106 corresponds to an example of "phase matching information" of the disclosure. Further, the sampling of the current command signals performed during one forward movement corresponds to an example of "sampling during forward rotation" of the disclosure, the sampling of the current command signals performed during one return movement corresponds to an example of "sampling during reverse rotation" of the disclosure, and an operation of successively performing these corresponds to an example of "a pair of sampling operations" of the disclosure. In this embodiment, the correction data is generated by repeating this pair of sampling operations (n+1) times. Note that although the pair of sampling operations are repeated 20 times while switching the candidate for the similarity ratio during the similarity ratio matching process, the number of repetitions (number of candidates for the similarity ratio) is arbitrary without being limited to this.

As just described, in the first embodiment, the average current ripple calculated in Step S106 corresponds to an example of "in-rotation command information" of the disclosure. Here, an offset matched current ripple obtained by performing the offset matching process on the average current ripple as in a second embodiment described later may be used as the "in-rotation command information" of the disclosure. In this case, Step S117 becomes unnecessary and the similarity ratio matched data calculated in Step S116 can be used as the correction data.

Further, in the first embodiment, the phase matching process corresponds to an example of a "first step" of the disclosure. Further, the similarity ratio matching process corresponds to an example of a "second step" of the disclosure. The data obtained by multiplying the average current ripple by the similarity ratio (n/20) in this similarity ratio matching process corresponds to an example of a "correction data candidate" of the disclosure, an operation of obtaining this data corresponds to an example of a "correction data candidate generating step" of the disclosure and an operation of driving the motor M through a feedback control using this data corresponds to an example of a "motor driving step" of the disclosure.

In the thus configured disclosure, the in-forward-rotation command information and the in-reverse-rotation command information are respectively obtained while the motor is driven in the forward drive pattern and the return drive pattern. This in-forward-rotation command information is obtained by sampling command signals during one or more rotations of the rotary shaft in the forward direction in the constant speed region. Further, the in-reverse-rotation command information is obtained by sampling command signals during one or more rotations of the rotary shaft in the reverse direction in the constant speed region. Thus, the error increasing directions and the phase changing directions included in the in-forward-rotation command information and the in-reverse-rotation command information are directly opposite to each other as described in detail later and the correction data can be generated with high accuracy from the in-forward-rotation command information and the in-reverse-rotation command information utilizing such a characteristic. Further, the accuracy of the motor control is improved by executing a feedback control using the correction data generated in this way.

As described above, according to the disclosure, the correction data can be generated with high accuracy and the accuracy of the motor control can be improved since the correction data used in the motor control device is generated using the in-forward-rotation command information and the in-reverse-rotation command information.

C. Second Embodiment

Based on the second and third knowledge, the inventor reached a conclusion that the correction data could be generated with high accuracy by obtaining the current ripple from the sampling data obtained by sampling the command signals while the rotary shaft of the motor M rotates at the constant speed and multiplying the current ripple by a proper similarity ratio. A second embodiment of the disclosure for generating correction data using the above second and third knowledge will be described below with reference to the drawings.

Figure 14:
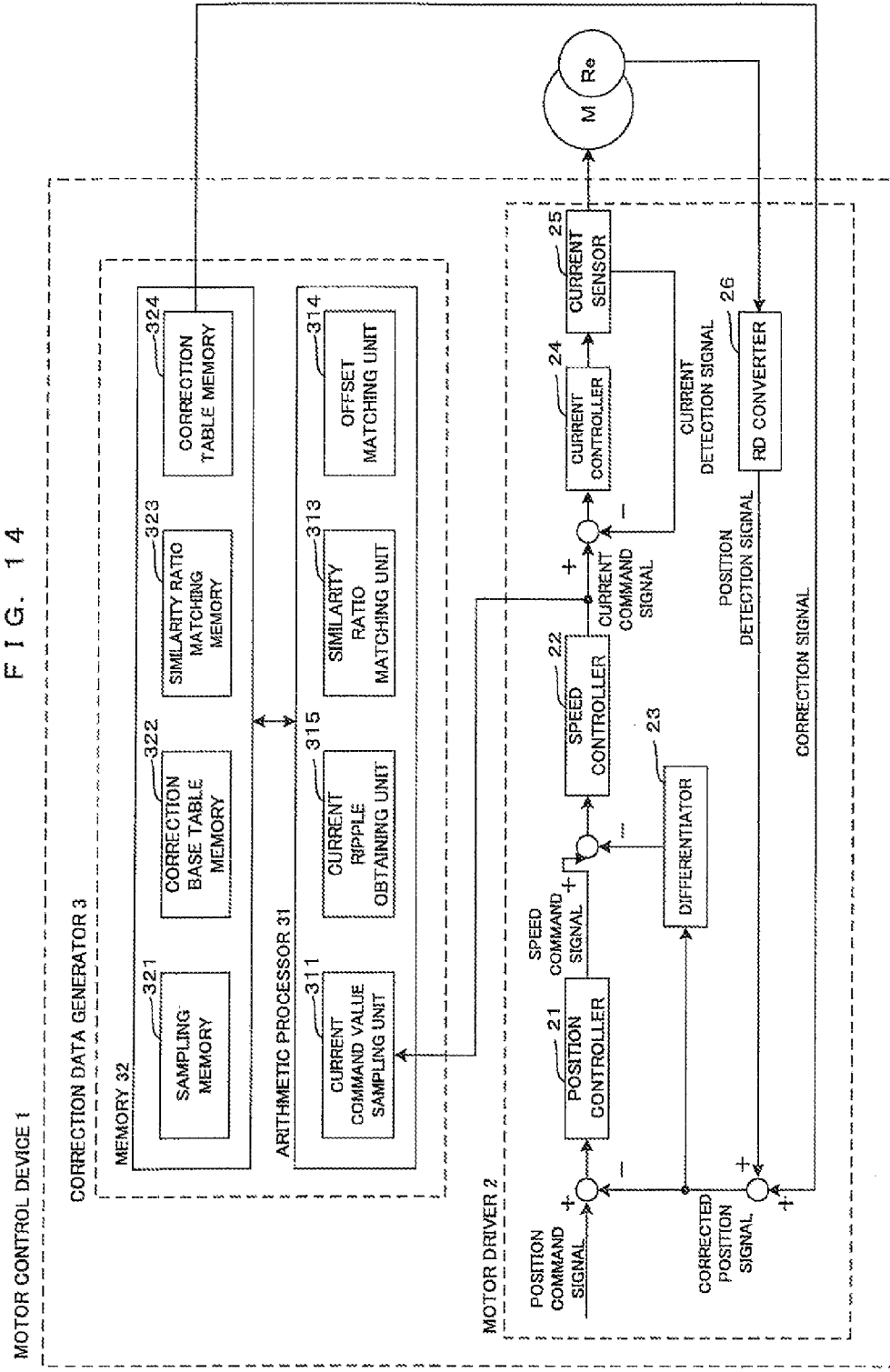
FIG. 14 is a diagram showing the electrical configuration of a second embodiment of the motor control device according to the disclosure.

FIG. 14 is a diagram showing the electrical configuration of the second embodiment of the motor control device according to the disclosure. This second embodiment largely differs from the first embodiment in the configuration of the correction data generator 3 and the configuration of the motor driver 2 is the same. Accordingly, a correction data generation method will be described after the configuration of a correction data generator 3 in the second embodiment is described and the same components are denoted by the same reference signs and not described.

This correction data generator 3 includes an arithmetic processor 31 having an arithmetic function such as a CPU (Central Processing Unit) or the like and a storage 32 having four memories 321 to 324. The arithmetic processor 31 samples current command signals output from a speed controller 22 in accordance with a program stored in advance while a motor M is reciprocally driven in predetermined drive patterns by a motor driver 2 and generates correction data by performing a current ripple obtaining process, an offset matching process and a similarity ratio matching process to be described in detail next. As just described, in this embodiment, the arithmetic processor 31 functions as a current command value sampling unit 311, a current ripple obtaining unit 315, a similarity ratio matching unit 313 and an offset matching unit 314.

Figure 15:
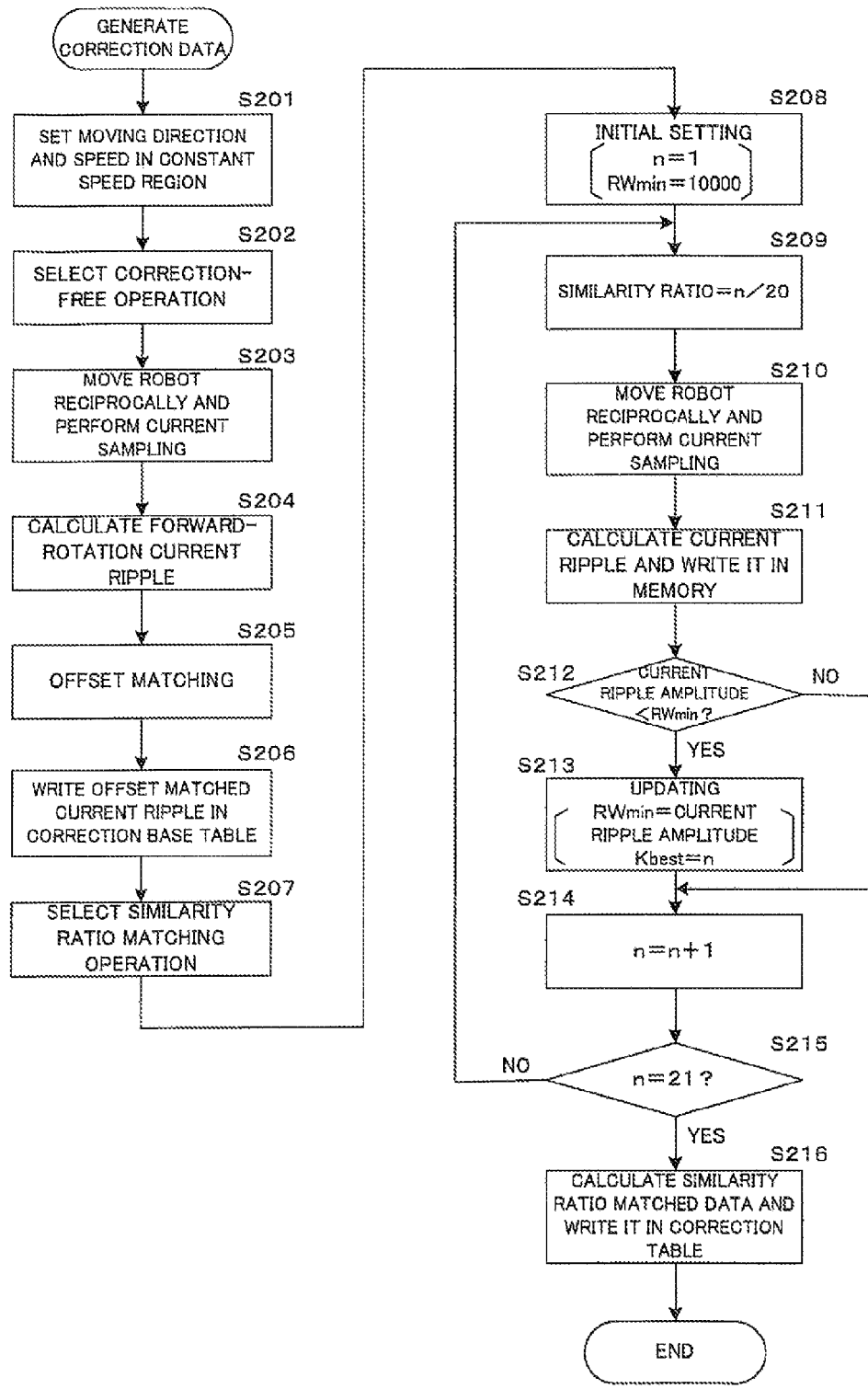
FIG. 15 is a flow chart showing a correction data generating operation in the motor control device shown in FIG. 14.

FIG. 15 is a flow chart showing a correction data generating operation in the motor control device shown in FIG. 14. In this embodiment, a correction data generating process described below is performed in a state where the motor M is incorporated in a device, e.g. in a state where a movable part (movable mechanism part such as a ball screw) of a robot is coupled to a rotary shaft of the motor M in the case of using the motor M as a drive source of the robot, when the motor M or a resolver Re is mounted or exchanged and when the generation of correction data is commanded by a user.

In Step S201, a moving distance of the robot and speeds V0+, V0− in constant speed regions are set. By these settings, an operation pattern in which the motor M drives the robot to operate the robot in performing the correction data generating process, i.e. a drive pattern of the motor M by the motor driver 2 is determined. Further, a plurality of operation modes are prepared in advance as operation modes of the motor driver 2. In the correction data generating process, a correction signal is not output to the motor driver 2 at first, i.e. a "correction-free operation" in which the motor M is driven without any correction by the correction data is selected (Step S202) and the current ripple obtaining process is performed (Steps S203 to S205).

In this current ripple obtaining process, the robot is reciprocally moved by starting the drive of the motor M by the motor driver 2 and current sampling is performed during a forward movement (Step S203). Specifically, by starting the drive of the motor M, the motor M rotates in the forward direction to accelerate a moving speed of the robot up to the speed V0+ over a predetermined time and, after the constant speed V0+ is maintained for a time corresponding to the moving distance set in Step S201, deceleration is started to stop the forward rotation of the motor M, for example, as shown in FIG. 16. A movement of the robot by the forward rotation of the motor M in this way is called a "forward movement", the drive pattern of the motor M for making such a movement is called a "forward drive pattern" and a region where the constant speed V0+ is maintained in that forward drive pattern is called a "constant speed region". Further, a current command value at each rotational angle, output from the speed controller 22 of the motor driver 2 during one rotation of the motor M and sampled at a fixed time interval, is written as "sampling data" in a current sampling memory 321.

In next Step S204, the current command values of one rotation are read from the current sampling memory 321 and an average value (direct-current component) thereof is calculated. Then, a forward-rotation current ripple is calculated by subtracting the above average value from the current command value at each rotational angle and overwritten in the current sampling memory 321. In this way, the forward-rotation current ripple, that is an AC component of the current command value during the forward movement, is obtained (FIG. 17).

Further, since a static actual error is zero at a rotational angle of zero, offset matching is performed (Step S205). That is, a value at a rotational angle of zero out of values at the respective rotational angles of the rotary shaft constituting the current ripple is set as offset data, and an offset matched current ripple (e.g. solid line in FIG. 18) is calculated by subtracting the offset data from the value at each rotational angle and written in a correction base table in the memory 322 (Step S206).

When the above current ripple obtaining process is completed and a "similarity ratio matching operation" is selected as the operation mode (Step S207), the similarity ratio matching process described below is performed from timing T1 at which the next reciprocal drive is started (FIG. 16) (Steps S208 to S215). In this similarity ratio matching process, various initial settings are first made. In this embodiment, "1" is set as an initial value of a count value n and a value obtained by subtracting a minimum value from a maximum value of the average current ripples of one rotation, i.e. a minimum value RWmin of a current ripple amplitude is set as a default value ("10000" in this embodiment) as one initial setting (Step S208). The similarity ratio is set at a value (n/20) in next Step S209. For example, the similarity ratio is set at the initial value (1/20) when n=1.

After the similarity ratio (n/20) is set, the offset matched current ripple is read from the correction base table memory 322 and a value obtained by multiplying this offset matched current ripple by the similarity ratio is output as a correction signal to the motor driver 2. Then, the robot is reciprocally moved and the current sampling is performed during this movement by starting the drive of the motor M by the motor driver 2 while performing a correction by the correction signal (Step S210). Note that the reciprocal movements and the current sampling operation are the same as those during the current ripple obtaining process (Step S203) except that the correction by the correction signal is performed, and the sampling data of one rotation is written in the current sampling memory 321. For example, when n=1, the current sampling of one rotation substantially in the center of the constant speed region of the forward drive pattern is performed while the motor M is driven from timing T1 to timing T2 in FIG. 16.

When the current sampling is completed, the current ripple is calculated and written in the similarity ratio matching memory 323 (Step S211). Specifically, the current ripple is calculated as in Step S204 described above. Then, the current ripple when the similarity ratio is set at (n/20) is written in the similarity ratio matching memory 323.

In next Step S212, after a current ripple amplitude is calculated from the current ripples of one rotation written in the similarity ratio matching memory 323, it is determined whether or not this current ripple amplitude is below the minimum value RWmin. If "YES" is determined in Step S212, i.e. the current ripple amplitude at the count value n is determined to be below the minimum value RWmin, a transition is made to Step S214 after the minimum value RWmin is updated to the current ripple amplitude and this count value n is written as an optimal value Kbest in the similarity ratio matching memory 323 (Step S213). Note that a storage destination of the optimal value Kbest is not limited to the similarity ratio matching memory 323 and the optimal value Kbest can be written in any arbitrary memory. On the other hand, if "NO" is determined in Step S212, a transition is directly made to Step S214 without updating the minimum value RWmin and the optimal value Kbest.

After the count value n is incremented by "1" in this Step S214, it is determined whether or not the count value n is "21" (Step S215). If "NO" in Step S215, i.e. while the count value n is determined to be not larger than "20", a return is made to Step S209 and a process of deriving the similarity ratio at which the current ripple amplitude is minimized (Steps S209 to S214) is repeated. That is, in this embodiment, (1/20), (2/20), . . . , (20/20) are prepared as candidates for the similarity ratio and the optimal value Kbest is determined after performing the similarity ratio deriving process for each candidate for the similarity ratio.

On the other hand, if "YES" is determined in Step S215, a transition is made to Step S209 of FIG. 15. In this Step S209, the optimal value Kbest is read from the similarity ratio matching memory 323 and an optimal similarity ratio (=Kbest/20) at which the current ripple amplitude is smallest is determined. Then, the offset matched current ripple is read from the correction base table memory 322, and similarity ratio matched data is generated by multiplying the value at each rotational angle constituting this offset matched current ripple by the optimal similarity ratio and written as correction data in the correction table memory 324 (Step S209). In this way, more accurate correction data is obtained.

As described above, according to this embodiment, it is possible to generate the correction data with high accuracy and improve the control accuracy of the motor M since the correction data used in the motor control device 1 is generated based on the knowledge described above.

Further, although it has been conventionally proposed as a method for generating correction data to mount a reference position detector and use an error from a position measured by the reference position detector as correction data, a correction facility for generating the correction data is separately necessary in this case. Contrary to this, in the above embodiment, the correction data can be generated by a unique function of the motor control device 1 without using this correction facility at all and performance can be improved. That is, the motor control device 1 according to the above embodiment has a self-correction function. Further, the correction data can be generated with the motor M mounted in the robot. Thus, even when the motor M is exchanged or repaired in a factory or the like where the robot is installed, correction data can be generated on the spot after the exchange or repair.

Further, in the above embodiment, the correction data is generated utilizing the current command signals after the speed command signal is amplified by the speed controller 22, a sufficiently high resolution can be obtained and position accuracy after the correction can be set higher than the conventional technology. Here, the correction data may be generated using current detection signals instead of the current command signals and functions and effects similar to those of the above embodiment are obtained.

As just described, in this embodiment, the resolver Re corresponds to an example of the "sensor" of the disclosure. Further, in the above embodiment, the offset matched current ripple is obtained by the current ripple obtaining process and the offset matching process and these processes correspond to an example of the "first step" of the disclosure. Further, the similarity ratio matching process corresponds to an example of the "second step" of the disclosure. Data obtained by multiplying the offset matched current ripple by the similarity ratio (n/20) in this similarity ratio matching process corresponds to an example of the "correction data candidate" of the disclosure, an operation of obtaining this data corresponds to an example of the "correction data candidate generating step" and an operation of driving the motor M through a feedback control using this data corresponds to an example of the "motor driving step" of the disclosure.

Further, the offset matched current ripple calculated in Step S206 corresponds to an example of the "in-rotation command information" of the disclosure. Note that the forward-rotation current ripple may be used as the "in-rotation command information" of the disclosure. In this case, the current ripple obtaining process corresponds to an example of the "first step" of the disclosure. Further, since the offset matching process is not performed before the similarity ratio matching process is performed, it is desirable to use the offset matched data obtained by performing the offset matching process on the similarity ratio matched data as the correction data. Further, although the forward-rotation current ripple is obtained from the sampling data obtained by performing the current sampling during forward rotation and the offset matched current ripple, the similarity ratio matched data and the like are further calculated in the above embodiment, sampling data obtained by performing the current sampling during reverse rotation may be used instead of the forward-rotation sampling data. That is, the correction data may be generated based on the reverse-rotation current ripple.

In the thus configured disclosure, the command signals are sampled during one or more rotations of the rotary shaft in the constant speed region. Then, the in-rotation command information is obtained from the sampling data. This in-rotation command information has a similarity relationship with the dynamic actual error and the correction data can be generated with high accuracy by multiplying the in-rotation command information by the similarity ratio. Further, the accuracy of the motor control is improved by executing the feedback control using the correction data generated in this way.

As described above, according to the disclosure, it is possible to generate correction data with high accuracy and improve the control accuracy of a motor control since the correction data used in a motor control device is generated by multiplying in-rotation command information by a similarity ratio.

D. Miscellaneous

Note that the disclosure is not limited to the above embodiments and various changes other than the aforementioned ones can be made without departing from the gist of the disclosure. For example, although the disclosure is applied to the motor control device 1 for controlling the motor M using the signals output from the resolver Re in the above embodiments, the disclosure is applicable also to a motor control device using a position detection sensor other than the resolver Re such as an encoder as the sensor of the disclosure.

Further, the sampling period of the current command signals is one rotation of the motor M in the above embodiments, the current command signals may be sampled during more than one rotation. For example, if the current command signals are sampled during m rotations, the "forward-rotation current ripple" and the "reverse-rotation current ripple" may be derived by averaging m pieces of the sampling data at each rotational angle.

Further, although the pair of sampling operations are repeated 20 times while the candidate for the similarity ratio is switched during the similarity ratio matching process as shown in FIGS. 7 and 15 in the above embodiments, this number of repetitions (number of the candidates for the similarity ratio) is arbitrary without being limited to this.

Further, in the above embodiments, the average current ripple (phase matching information) is obtained by averaging the forward-rotation current ripple and the reverse-rotation current ripple. However, the average current ripple may be obtained by averaging sampling data during forward rotation and sampling data during reverse rotation. That is, a step of removing the direct current component may be omitted and the phase matching information may be obtained from both pieces of the sampling data, whereby signal processing can be simplified.

Further, in the above embodiments, current sampling is performed in the phase matching process and the similarity ratio matching process while the motor is driven in the same drive pattern. However, it is not essential that the drive patterns coincide. In the phase matching process, the influence of rotational friction of a reduction gear (not shown) coupled to the rotary shaft of the motor is small and current sampling is desirably performed at a speed at which similarity to the position detection error of the resolver is high. Contrary to this, in the similarity ratio matching process, there is no influence of the above rotational friction and current sampling is desirably performed at a speed at which an effect by correction is largely exhibited. Accordingly, to satisfy such a demand, the drive patterns are preferably so set that the absolute values of the speeds V0+, V0− in the constant speed region in the phase matching process are larger than those in the similarity ratio matching process.

Furthermore, although the motor M is used as the drive source of the robot in the above embodiments, an application object of the disclosure is not limited to a technology for controlling a motor mounted in a robot. That is, the disclosure can be, for example, applied also to motor control devices for controlling a motor mounted in devices including a movable part driven by a motor such as surface mounting machines, part inspection apparatuses, semiconductor manufacturing apparatuses and other industrial apparatuses.

This disclosure is applicable to correction data generation technologies in general for generating correction data for correcting a signal output from a sensor connected to a rotary shaft of a motor and motor control technologies in general for controlling the motor using the correction data.

Although the disclosure has been described with reference to specific embodiments, this description is not meant to be construed in a limiting sense. Various modifications of the disclosed embodiment, as well as other embodiments of the present disclosure, will become apparent to persons skilled in the art upon reference to the description of the disclosure. It is therefore contemplated that the appended claims will cover any such modifications or embodiments as fall within the true scope of the disclosure.

What is claimed is:

1. A correction data generation method for generating correction data in a motor control device that generates a position detection signal relating to a rotational position of a rotary shaft of a motor based on a signal output from a sensor in accordance with a rotational angle of the rotary shaft of the motor which rotates in response to a command signal and that controls the motor by feeding back a corrected position signal obtained by correcting the position detection signal with the correction data, the method comprising:
   obtaining in-forward-rotation command information by sampling the command signals during one or more rotations of the rotary shaft in a forward direction in a constant speed region while the motor is driven in a forward drive pattern including the constant speed region where the rotary shaft rotates in the forward direction at a constant speed;
   obtaining in-reverse-rotation command information by sampling the command signals during one or more rotations of the rotary shaft in a reverse direction in a constant speed region while the motor is driven in a return drive pattern including the constant speed region where the rotary shaft rotates in the reverse direction at the constant speed; and
   generating the correction data using the in-forward-rotation command information and the in-reverse-rotation command information.

2. The correction data generation method according to claim 1, wherein:
   the sampling during the forward rotation and the sampling during the reverse rotation are both performed N times, where N is a natural number not smaller than 2.

3. The correction data generation method according to claim 2, wherein:
   a pair of sampling operations in which the sampling during the forward rotation and the sampling during the reverse rotation are respectively performed once are repeated the N times.

4. The correction data generation method according to claim 3, wherein:
   the correction data is determined after the pair of sampling operations are repeated the N times.

5. The correction data generation method according to claim 1, wherein:
   the command signal is a signal relating to a current given to the motor.

6. The correction data generation method according to claim 5, wherein:
   the in-forward-rotation command information and the in-reverse-rotation command information are current command values at each rotational angle of the rotary shaft.

7. The correction data generation method according to claim 5, wherein:
   the in-forward-rotation command information and the in-reverse-rotation command information are current detection signals of the motor at each rotational angle of the rotary shaft.

8. The correction data generation method according to claim 5, wherein:
   sampling of the command signals is performed at each rotational angle of the rotary shaft.

9. The correction data generation method according to claim 5, further comprising:
   a first step of reciprocally driving the motor by feeding back the position detection signal without correcting the position detection signal with the correction data and obtaining phase matching information based on a forward-rotation current ripple obtained during the forward drive and a reverse-rotation current ripple obtained during the return drive; and
   a second step of calculating the correction data from the phase matching information.

10. The correction data generation method according to claim 9, wherein, in the first step:
   a forward-rotation current ripple is calculated by removing a direct-current component from the in-forward-rotation command information;
   a reverse-rotation current ripple is calculated by removing a direct-current component from the in-reverse-rotation command information; and as the phase matching information, an average current ripple at each rotational angle of the rotary shaft is obtained by averaging the forward-rotation current ripple and the reverse-rotation current ripple at each rotational angle.

11. The correction data generation method according to claim 9, wherein:
as the phase matching information, an average current ripple at each rotational angle of the rotary shaft is obtained by averaging the in-forward-rotation command information and the in-reverse-rotation command information at each rotational angle in the first step.

12. The correction data generation method according to claim 9, wherein, in the second step:
the correction data is calculated based on similarity ratio matched data at each rotational angle obtained by multiplying the phase matching information by a similarity ratio.

13. The correction data generation method according to claim 12, wherein:
a plurality of similarity ratio candidate values different from each other are prepared as candidates for the similarity ratio;
for each similarity ratio candidate value, the motor is reciprocally driven by feeding back a corrected position signal obtained by correcting the position detection signal based on data obtained by multiplying the phase matched information by the similarity ratio candidate value, average current ripples at the respective rotational angles of the rotary shaft are calculated based on the forward-rotation command information obtained during the forward rotation and the reverse-rotation command information obtained during the reverse rotation, and a difference between a maximum value and a minimum value out of average current ripples is calculated; and
the similarity ratio candidate value, at which the current ripple amplitude has a minimum value, out of the plurality of similarity ratio candidate values is set as the similarity ratio.

14. The correction data generation method according to claim 12, wherein, in the second step:
similarity ratio matched data at a rotational angle of zero out of those at the respective rotational angles of the rotary shaft is set as offset data; and
offset matched data obtained by subtracting the offset data from the similarity ratio matched data at each rotational angle is set as the correction data.

15. The correction data generation method according to claim 13, wherein:
the average current ripple is obtained by averaging a forward-rotation current ripple and a reverse-rotation current ripple, the forward-rotation current ripple being calculated by removing a direct-current component from the in-forward-rotation command information obtained during the forward drive, the reverse-rotation current ripple being calculated by removing a direct-current component from the in-reverse-rotation command information obtained during the return drive.

16. The correction data generation method according to claim 13, wherein:
the average current ripple is obtained by averaging the in-forward-rotation command information obtained during the forward drive and the in-reverse-rotation command information obtained during the return drive at each rotational angle.

17. The correction data generation method according to claim 13, wherein:
the motor is driven in the forward drive pattern and the reverse drive pattern in the second step; and
absolute values of the constant speed in the first step are larger than those in the second step.

18. The correction data generation method according to claim 17, wherein, in the second step:
a plurality of similarity ratio candidate values different from each other are prepared as candidates for the similarity ratio;
for each similarity ratio candidate value, the motor is reciprocally driven in the drive pattern by feeding back a corrected position signal obtained by correcting the position detection signal based on data obtained by multiplying the in-rotation command information by the similarity ratio candidate value and a difference between a maximum value and a minimum value out of current ripples is calculated based on sampling data obtained by sampling the command signals during the forward rotation and during the reverse rotation; and
the similarity ratio candidate value, at which the current ripple amplitude has a minimum value, out of the plurality of similarity ratio candidate values is set as the similarity ratio.

19. The correction data generation method according to claim 18, wherein, in the second step:
the current ripple is obtained by averaging a forward-rotation current ripple and a reverse-rotation current ripple at each rotational angle of the rotary shaft, the forward-rotation current ripple being calculated by removing a direct-current component from sampling data obtained by sampling the command signals during the forward drive, the reverse-rotation current ripple being calculated by removing a direct-current component from sampling data obtained by sampling the command signals during the return drive.

20. The correction data generation method according to claim 18, wherein, in the second step:
the current ripple is obtained by averaging sampling data obtained by sampling the command signals during the forward-rotation and sampling data obtained by sampling the command signals during the reverse-rotation at each rotational angle of the rotary shaft.

21. The correction data generation method according to claim 19, wherein, in the second step:
the similarity ratio is determined by performing each of sampling during the forward rotation and during the reverse rotation at a plurality of times.

22. The correction data generation method according to claim 21, wherein, in the second step:
the similarity ratio is determined by repeating an operation of performing each of the sampling during the forward rotation and during the reverse rotation once at a plurality of times.

23. The correction data generation method according to claim 20, wherein, in the second step:
similarity ratio matched data at a rotational angle of zero out of those at the respective rotational angles of the rotary shaft is set as offset data; and
offset matched data obtained by subtracting the offset data from the similarity ratio matched data at each rotational angle is set as the correction data.

24. The correction data generation method according to claim 18, wherein:
absolute values of the constant speed in the first step are larger than those in the second step.

25. The correction data generation method according to claim 1, wherein:
the sensor is a resolver; and
the constant speed is 15 rps to 100 rps.

26. A motor control device for generating a position detection signal relating to a rotational position of a rotary shaft of a motor, which rotates in response to a command signal, based on a signal output from a sensor in accordance with a rotational angle of the rotary shaft and controlling the motor by feeding back a corrected position signal obtained by correcting the position detection signal with the correction data, the device comprising:
 a motor driver for driving the motor; and
 a correction data generator for generating the correction data, wherein,
 in generating the correction data:
 the motor driver performs forward drive for driving the motor in a forward drive pattern including a constant speed region where the rotary shaft rotates in a forward direction at a constant speed and return drive for driving the motor in a return drive pattern including a constant speed region where the rotary shaft rotates in a reverse direction at the constant speed; and
 the correction data generator obtains in-forward-rotation command information by sampling the command signals during one or more rotations of the rotary shaft in the forward direction in the constant speed region during the forward drive, obtains in-reverse-rotation command information by sampling the command signals during one or more rotations of the rotary shaft in the reverse direction in the constant speed region during the return drive and generates the correction data using the in-forward-rotation command information and the in-reverse-rotation command information.

* * * * *